June 26, 1928. 1,675,294
F. R. FILTER
TANK WAGON
Filed April 17, 1924 4 Sheets-Sheet 1

Inventor:
Frank R. Filter
by Chas. F. Randall
Attorney.

June 26, 1928. 1,675,294
F. R. FILTER
TANK WAGON
Filed April 17, 1924 4 Sheets-Sheet 2
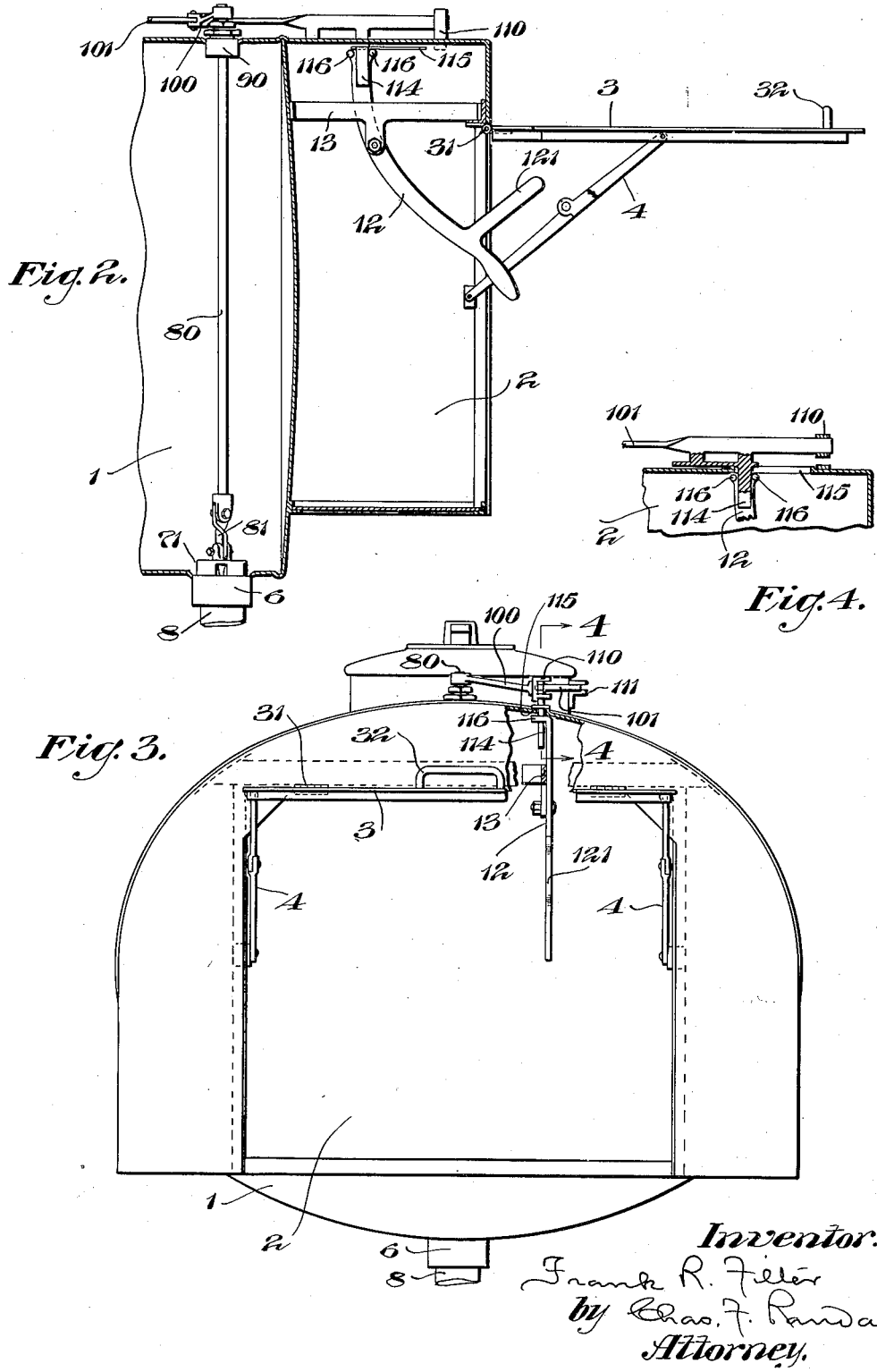

June 26, 1928.
F. R. FILTER
TANK WAGON
Filed April 17, 1924    4 Sheets-Sheet 3
1,675,294
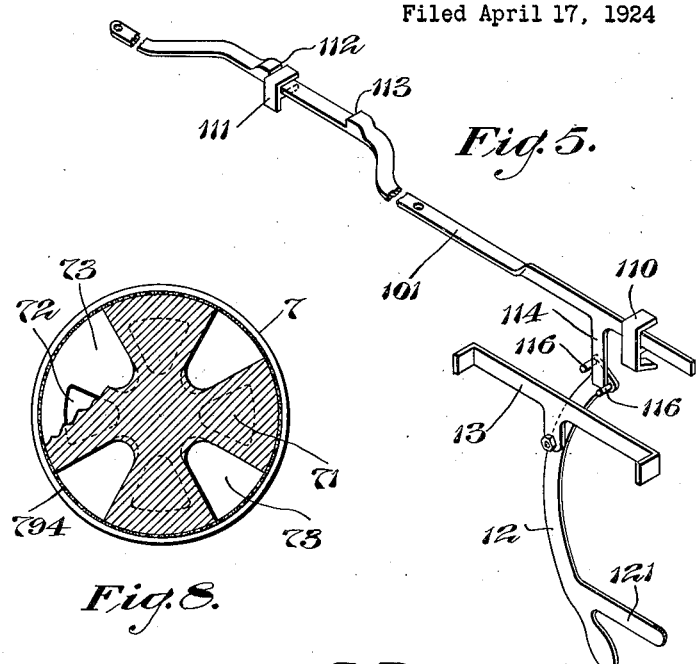
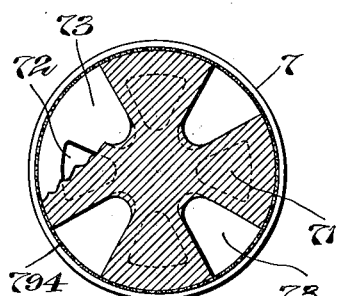
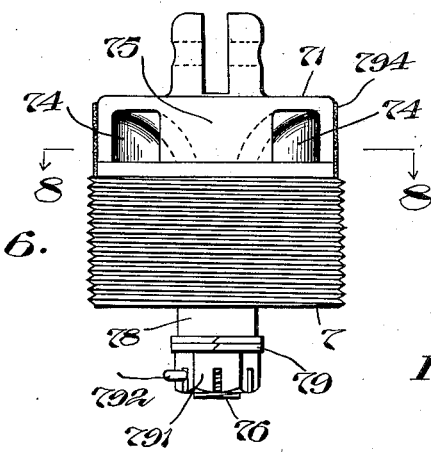
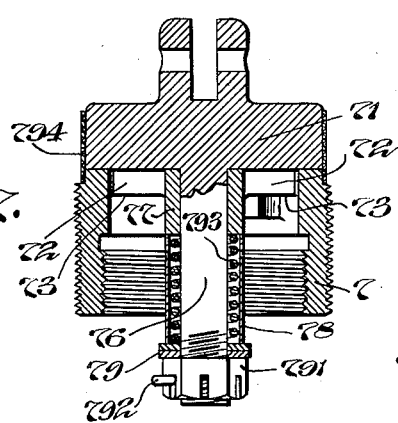
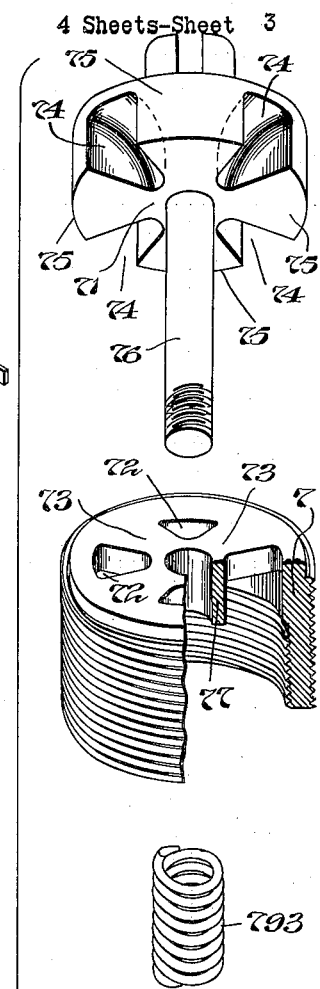
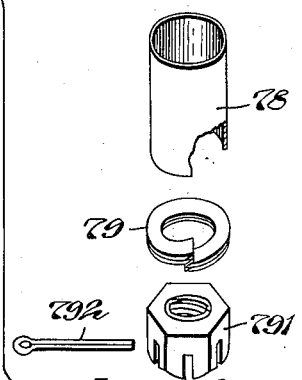
Inventor:
Frank R. Filter
by Chas. F. Randall
Attorney.

June 26, 1928. 1,675,294
F. R. FILTER
TANK WAGON
Filed April 17, 1924 4 Sheets-Sheet 4
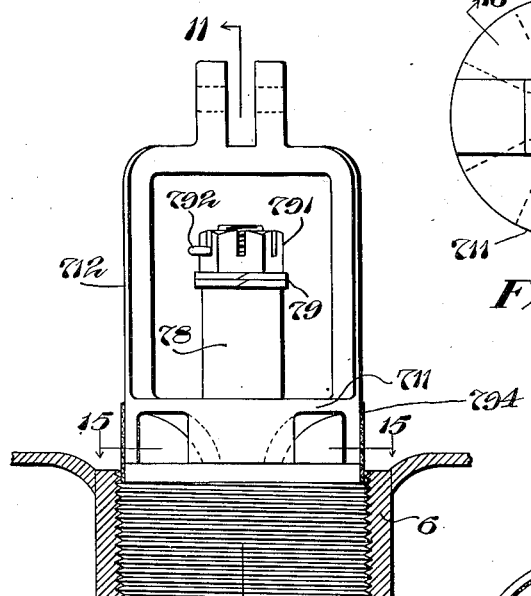
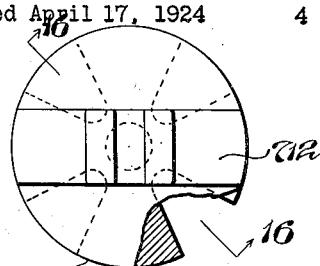
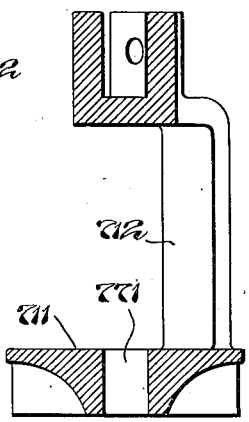
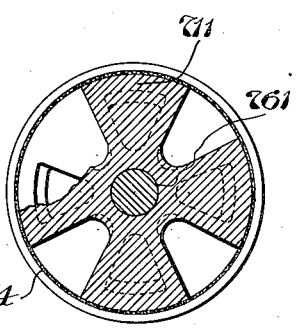
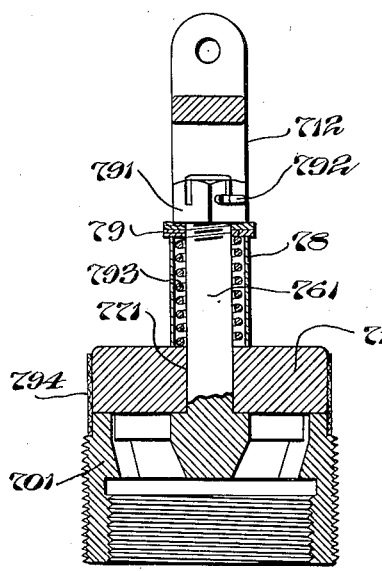
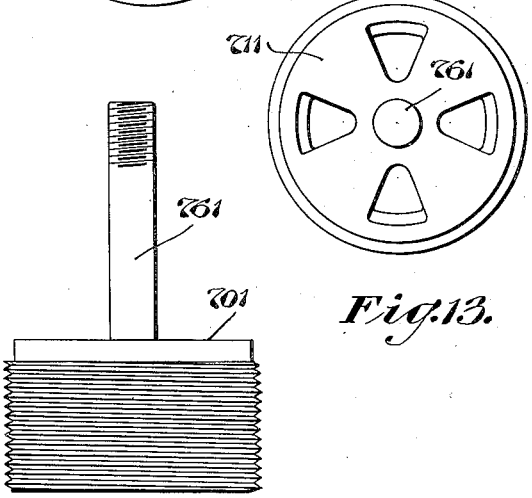
Inventor:
Frank R. Filter
by Chas. F. Randall
Attorney.

Patented June 26, 1928.

1,675,294

UNITED STATES PATENT OFFICE.

FRANK R. FILTER, OF WALTHAM, MASSACHUSETTS, ASSIGNOR TO STANDARD OIL COMPANY OF NEW YORK, OF NEW YORK, N. Y., A CORPORATION OF NEW YORK.

TANK WAGON.

Application filed April 17, 1924. Serial No. 707,099.

The invention relates to the devices which are provided for the purpose of closing or opening, as may be required, the outlet located at the bottom of a tank through which, when open, the liquid contents of the tank pass from the latter.

In the case of tank wagons which have been employed heretofore for transporting and dispensing liquid fuel such as gasoline, kerosene, etc., the interior space or spaces of a tank has or have respectively been furnished in connection with the outlet at the bottom thereof with a so-called emergency valve having a valve-member that is movable toward and from its seat for closing and opening the valve. Valve-actuating mechanism at the exterior of the tank has been connected with said movable valve-member by means comprising or including a rod which extends through a stuffing-box in the top of the tank and slides lengthwise within said stuffing-box as the valve is closed and opened. The closing movement of the movable valve-member has been caused by a spring, the latter tending to carry such member against the valve-seat. The constructions and arrangements heretofore employed have various drawbacks or disadvantages. Sometimes, after an emergency valve has been opened, the complete closing of the movable valve-member against the valve-seat is prevented by matter intervening between the two, such for instance as a chip accidentally present within the tank. The work of clearing the valve entails trouble and inconvenience, because ordinarily for the purpose of permitting access to the valve the tank must be emptied, its interior must be freed from noxious vapor or gas, and the person performing such work must enter within the tank through a man-hole in its top. The necessary close fit of the stuffing-box around the valve-actuating rod interferes with free and easy movement of the said rod through the stuffing-box, from which it happens sometimes that after the rod has been drawn upward to open the valve the rod sticks in a raised position and the valve fails to close.

The invention provides novel and improved devices, etc., which among other things, remedy the foregoing disadvantages and drawbacks. The basis upon which the invention principally has been founded is the principle of avoiding the usual mode of operation which consists in opening a tank discharging valve through lifting a valve-member from its seat, and closing the valve through returning the valve-member to such seat. A further basis is that of employing for the actuation of the movable valve-member, instead of a lengthwise movable valve-actuating rod which slides longitudinally through a stuffing-box, a rotatable rod or shaft which turns in a bearing.

Illustrative embodiments of the features of the invention are shown in the drawings, in which Fig. 1 is a view showing in vertical longitudinal section a tank-wagon tank having one of the said embodiments combined therewith, with the door of the so-called bucket-box or can-box closed.

Fig. 2, Sheet 2, is a view in similar section showing the rear portion of the tank, etc., with the bucket-box door open.

Fig. 3 is a view in elevation looking from the right hand side in Fig. 2, certain small portions being broken away in order to show certain details that otherwise woud be hidden.

Fig. 4 is a sectional view of certain of the details of Figs. 1 and 2, showing a portion of the transmitting rod, and the top of the bucket-box.

Figure 1:
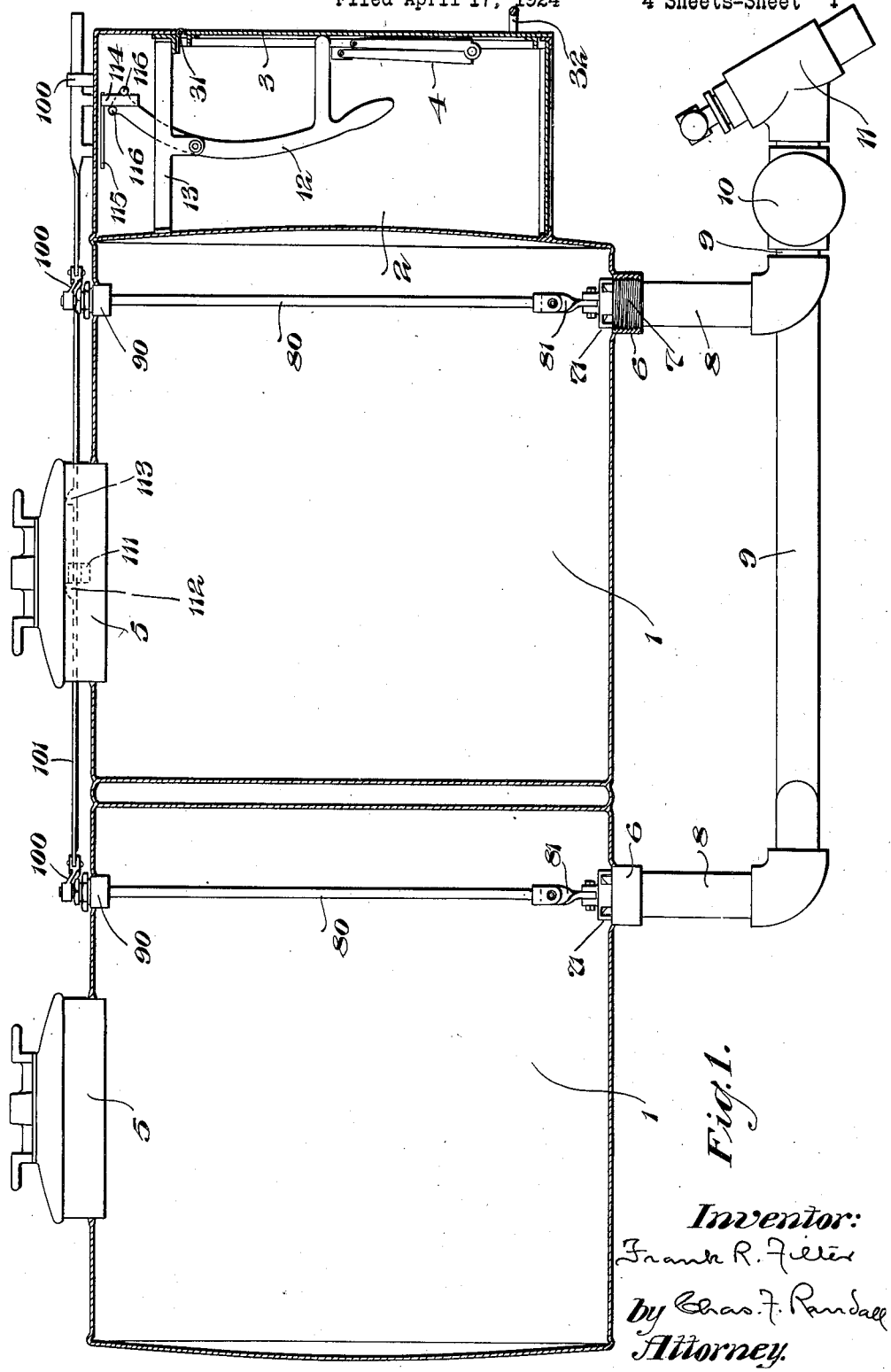

Fig. 5, Sheet 3, is an isometric view of the hand-lever, lever-supporting bracket, and transmitting rod actuated by the said hand-lever, of Figs. 1 to 4.

Fig. 6, Sheet 3, is a side elevation of one form of valve which may be employed in carrying the invention into effect, the wire-gauge screen to which reference is made later herein being in vertical section.

Fig. 7 is a view showing the said form of valve mainly in central vertical section.

Fig. 8 is a view in horizontal section on line 8, 8, of Fig. 6, with a portion of the movable valve-member broken away.

Fig. 9 is a group of detail views showing the elements of the valve of Figs. 6 to 8 separately, portions being broken away in some of the said views.

Fig. 10, Sheet 4, is a view showing in vertical section, portions of a tank-bottom and a coupling applied thereto and projecting downward therefrom, and showing in elevation a second form of valve.

Fig. 11 is a view of the said second form of valve, mainly in vertical section on line 11, 11, of Fig. 10.

Fig. 12 shows the valve-body of Figs. 10 and 11 in elevation.

Fig. 13 is a bottom view of the valve-body of Figs. 10 to 12, and Fig. 14 is a top view of the movable valve-member of Figs. 10 and 11 with a certain portion broken away.

Fig. 15 is a view in horizontal section on line 15, 15, of Fig. 10 with a portion of the movable valve-member broken away.

Fig. 16 is a view showing in vertical section the movable valve-member shown in Figs. 10 and 11.

The tank shown by way of illustrating a practical application of the features of the invention has two liquid-containing compartments 1, 1. Also, the usual so-called bucket-box or can-box 2 at the rear end of the tank, intended to hold the buckets or cans that are employed for measuring the liquid as it is dispensed from the said compartments. The said bucket-box is furnished as usual with a door 3, which in this instance is hinged at its top at 31 to the upper portion of the bucket-box, so that the door may be swung rearward and upward, to its position in Fig. 2, to open the bucket-box, and reversely downward to its position in Fig. 1 to close the bucket-box. At 32, Figs. 1, 2, 3, a handhold upon the outside of the door is shown. Jointed braces 4, 4, of convenient form are shown, designed to hold the door in open position as in Figs. 2 and 3, they being constructed to fold down within the bucket-box as in Fig. 1 when the door is closed. The respective compartments 1, 1, of the tank have the usual man-holes in the top of the tank, closed by removable man-hole covers 5, 5, Fig. 1. At the outlet in the bottom of the tank for each compartment the said bottom is provided with a coupling 6, and 7 is a valve-body which is applied to the said coupling. A short vertical section 8 of piping, termed a nipple, extends downward at each bottom outlet of the tank, such section constituting a portion of one of the pipe lines 9, 9, leading to a manifold 10 having in connection therewith dispensing faucets, one of which is shown at 11, Fig. 1.

In order to obviate clogging of the outlet by matter which prevents closing of the valve, I provide a valve having the movable member thereof in sliding continuous contact with the valve-seat. One form of valve of this general description, of grid type, is shown in Figs. 6 to 9. A second form is shown in Figs. 10 to 16. The form shown in Figs. 6 to 9 is a form in which the movable valve-member is a disk 71 contacting by one side thereof with a valve-seat constituted by one end of valve-body 7. Ports 72, 72, in the head of valve-body 7, paralleling the longitudinal axis of the valve-body, alternate in an annular series with solid radial portions 73, 73, of the said head, forming a grid. Radial ports 74, 74, comprising an annular series in the disk 71, open at the side of said disk which contacts with the valve-seat and also open at the periphery of the disk, alternate with solid radial portions 75, 75, the movable valve-chamber being in effect a second grid. The said movable valve-member is mounted to turn relative to the valve-body, in this instance by means of a spindle 76 projecting from the movable valve-member centrally of the series of ports 74, 74, and occupying a bearing at 77 in the valve-body centrally of the annular series of ports 72, 72. As will of course be apparent, when the movable valve-member is turned around the central axis thereof so as to place the downwardly facing ports thereof over the solid portions 73, 73, of the stationary valve-body the valve is closed so as to prevent flow therethrough. When the said movable member is turned so as to present its ports 74, 74, in registering relations with ports 72, 72, of the valve-body the valve is open to permit flow therethrough. The contacting surfaces of the movable valve-member and the valve-body are at all times fitted together and slide upon each other, so that foreign matter cannot enter between them, and the sliding movement of the surface of one of the said ports in contact with the proximate surface of the other thereof renders the valve self-clearing.

The means of keeping the movable valve-member in contact with the valve-seat may vary in practice. In the case of the construction shown in Figs. 6 to 9 such result is attained by means of a sleeve 78 around the spindle 76, between the under side of the head of the valve-body and a (lock) washer 79 and nut 791 upon the threaded lower end of the spindle. A cotter-pin 792 is shown employed for the purpose of preventing accidental turning of the said nut. An expanding coil spring 793 is shown in Figs. 7 and 9 surrounding the spindle 76 inside sleeve 78, such spring being represented in Fig. 7 as confined between the head of the valve-body and the washer 79, and being adapted to ensure that the movable valve-member shall be pressed against the valve-body. This spring may be omitted, if desired.

Instead of the longitudinally movable valve-actuating rod which has been employed heretofore, working endwise within a stuffing-box where the said rod passes from the interior of a tank to the exterior of the latter, I employ a rotatable valve-actuating shaft or rod which does not move endwise. Such a rod is shown at 80 in Figs. 1 and 2 in each compartment of the tank, and at 90, 90, are bearings mounted in the top of the shell of the tank, suitably packed to prevent leakage of vapor or liquid therethrough and through which, respectively, the respective rods 80, 80, extend from the interior of the tank to the exterior thereof. Inasmuch as it has been usual in practice heretofore to arrange the valve-actuating rods vertically, with the stuffing-boxes located in the top of the tank shell, such arrangement has been retained, as the preferred arrangement, in the case of the construction shown in the drawings, and consequently the valve in this instance is disposed so that the axes of the rotatable valve-members are vertical.

To compensate for any want of alinement between the point at which a rod 80 passes through a bearing 90 and the axis of a valve, the lower end of each rod 80 is connected with the corresponding rotatable valve-member by loose-jointed connecting means in a manner permitting any ordinary extent of offset while compelling the said valve-member to turn in unison with the rod. The means of establishing such connection may vary in accordance with known practices in the art. Herein a universal joint connection 81 is shown, comprising a link which is hinged by its lower end to the rotatable valve-member, between lugs rising therefrom, with capacity to swing relative to such member in one vertical plane, and by its upper end to the lower end of the rod 80 with capacity to swing relative to the rod in a plane at right angles to the first.

The operating mechanism for each rotatable valve-actuating rod or shaft 80, by which the valves may be operated to open or close the outlets, connects with the upper end of the said rod or shaft, above the top of the tank. Such operating mechanism comprises, in the illustrated embodiment of the features of the invention, a crank-arm 100 fixed upon the said upper end of the rod or shaft 80, and an endwise movable rod 101 extending longitudinally of the tank, at the top thereof, and connected pivotally with each crank-arm. The rod 101 is sustained in place and guided by means of crank-arms 100, 100, and by guides 110, 111, upon the top of the tank. Stop shoulders 112, 113, upon the rod 101 engage with guide 111, as will be clear from Fig. 5, to arrest the endwise movement of the said rod when the valve has reached its fully opened position, or fully closed position, as the case may be. Rod 101 has associated with it means for manually moving it endwise from a convenient point. Such point may be located at either the front end of the tank, or the rear end thereof, or at an intermediate point, as preferred, but herein the rear end of rod 101 is combined operatively with an actuating hand-lever 12, Figs. 1, 2, 3, located within the bucket-box 2 and having a suitable handle which may be grasped for the purpose of moving it manually. The said rear end has a projecting portion, 114, Figs. 1 to 5, extending downward therefrom through a slot 115 in the top of the bucket-box extending lengthwise of the tank, such portion 114 being entered between two lugs or pins 116, 116, projecting from the upper arm of the hand-lever 12. Such lever is mounted pivotally upon a fixed support 13 within the bucket-box.

Through movement of lever 12 the projection 114 and rod 101 are moved longitudinally of the tank to rock or turn the rotatable valve-rods or shafts 80, 80, around their longitudinal axes so as to open or close the emergency valves.

As heretofore in some cases, lever 12 is utilized to ensure closing of the emergency valves after a delivery of liquid has been made from the faucets, before the vehicle is moved to another place. To this end, the construction is made such that in the closed condition of the said valves the lever 12 occupies the position in which it is represented in Fig. 1. In this position its extension 121 is located within the bucket-box and does not interfere with the closing of the door fully home. When the door has been opened as in Fig. 2, and the lever has been moved into the position shown in such view to open the emergency valves so as to permit of dispensing from the faucets, the extension 121 projects out of the bucket-box into the path in which the door has to move in closing. Movement of the lever inward into the bucket-box by hand to take extension 121 out of the way of the door and permit the door to be closed home will close the emergency valves. If the lever is not thus moved out of the path of the door before the movement of the door toward closed position occurs, the door in such movement will encounter the extension 121, which will obstruct the closing movement unless sufficient power is applied to the door to force the lever ahead of it into the bucket-box.

Figs. 6, 7 and 9 illustrate a special feature of the valve-body of practical importance. The exterior of the valve-body is screw-threaded to enable the valve-body to be screwed into the screw-threaded interior of the coupling 6 fixed to the bottom of the tank at the outlet of a compartment of the tank. The downwardly extending flange or skirt of the valve-body has an internal screw thread to enable the screw-threaded upper end of nipple 8 to be screwed into the valve-body. The thread of the exterior of the valve-body is of one hand, say left handed, while that of the interior of the valve-body is of the opposite hand, i. e., right handed. This enables the nipple 8 to be screwed upward completely home within the valve-body without causing the valve-body to unscrew upwardly within the coupling. The operation of screwing the nipple upwardly within the valve-body tends to screw the valve-body more completely down within the coupling 6.

The second form of valve, as shown in Figs. 10 to 16, is similar to the form that has already been described herein with reference to Figs. 6 to 9, so far as the features in general of the two forms are concerned. The said second form differs from the said first form in certain respects which render the second form more convenient than the first form when removal, replacement, adjustment, or other attentions are required. In the case of the first form, the movable valve-member is furnished with a central spindle 76 that extends from the disk of such member downward through a central eye or bearing at 77 in the valve-body, and to the lower portion of the said central spindle, below the head of the valve-body, the sleeve 78, spring 793, washer 79, nut 791, and cotter-pin 792 are applied. When the nipple 8 is screwed up into the hollow lower portion of the valve-body in assembling the parts, it surrounds and conceals the elements which have just been named. It is necessary to remove the nipple, etc., before the nut, etc., can be disconnected so as to permit the movable valve-member to be lifted from the valve-seat. In the case of the second form, the spindle, 761, which centers the movable valve-member, 711, with relation to the valve-body, 701, is formed upon the central portion of the head of the valve-body and projects upward therefrom, and a central eye or bearing, 771, Fig. 16, is formed in the said movable valve-member. The said spindle projects upward through the said eye or bearing, and receives upon itself above the movable valve-member a sleeve 78, spring 793, washer 79, nut 791, and cotter-pin 792, corresponding with those of the first form. The lower end of the universal joint coupling member is connected with the movable valve-member through being hinged to lugs on the cross-bar at the top of a yoke or bail, 712, rising from the said valve-member. In the case of the second form, disassembling, repairs, cleaning, reassembling, etc., can be effected by a workman within the tank, without necessarily disconnecting the nipple 8 from the valve-body.

An encircling screen, 794, Figs. 6, 7, 10, 11, of wire gauze or other strainer material around the periphery of the movable valve-member, and lapping down around the upper portion of the valve-body, serves to exclude chips and other like matters from the ports of the said valve-member.

The valve-constructions which are shown and described are not per se claimed herein. They are made the subject of claims in my divisional application filed April 23, 1928, Serial No. 272,056.

What is claimed as the invention is:

1. The combination with a tank, of a packed stuffing-box or bearing in the top of the shell, an outlet valve of grid type at the bottom of the tank, having a rotatable valve-member in flat sliding contact with a flat valve-seat, and a rotatable actuating rod or shaft operatively combined with the said valve-member, extending through the said bearing at the top of the tank, and means externally of the tank for turning the said rotatable rod or shaft around its longitudinal axis within such bearing so as to move the valve-member to close and open the valve.

2. The combination with a tank having a bearing at its top, of an outlet valve at the bottom of the tank having a movable valve-member in sliding contact with the valve-seat, a rotatable actuating rod or shaft extending through the said bearing and above the top of the tank provided with means for turning it so as to move said valve-member to close and open the valve, and a loose jointed connection between the lower end of said rod or shaft and said valve-member to compensate for departure from alinement between the bearing and the valve.

3. The combination with a tank having a bearing at its top, of an outlet valve at the bottom of the tank having a rotatable valve-member in sliding contact with the valve-seat, a rotatable actuating rod or shaft extending through the bearing and above the top of the tank provided with means for turning it so as to turn the valve-member to close and open the valve, and a loose jointed connection through which said rod or shaft in turning turns the valve-member, said loose jointed connection compensating for departure from alinement between the bearing and the valve.

4. The combination with a tank having a bearing at its top, of an outlet valve at the bottom of the tank having a rotatable valve-member in sliding contact with the valve-seat, a rotatable actuating rod or shaft extending through the bearing and above the top of the tank provided with means for turning it so as to turn the valve-member to close and open the valve, and a universal joint coupling through which said rod or shaft in turning turns the valve-member, said universal joint coupling compensating for departure from alinement between the bearing and the valve.

5. In a tank wagon, the combination with a tank having an outlet valve at its bottom, and a bucket-box having a movable door, of valve actuating means extending to the exterior of the tank, an endwise movable actuating rod for such means extending to the bucket-box and having a projection extending into the bucket-box and accompanying the rod in the endwise movement of the latter, and a hand-lever within the bucket-box which engages the said projection to move the rod endwise to close and open the valve when the hand-lever is moved.

6. In a tank wagon, the combination with a tank having an outlet valve at its bottom, and a bucket-box having a movable door, of valve actuating means extending to the interior of the tank, an endwise movable actuating rod for such means extending to the bucket-box and having a projection extending into the bucket-box and accompanying the rod in the endwise movement of the latter, and a hand-lever within the bucket-box which engages the said projection to move the rod endwise to close and open the valve when the hand-lever is moved, said hand-lever controlling and in turn being controlled by the door to ensure closing of the valve when closing of the door is undertaken.

7. The combination comprising a tank with internally-threaded outlet opening, a valve having an externally-threaded valve-body screwed into said outlet opening, said valve-body also having an internal thread, and a discharging pipe-section screwed into the valve-body, with the external and internal threads of the valve-body of opposite hands or directions, respectively.

FRANK R. FILTER.